(12) United States Patent
Eley (10) Patent No.: US 8,191,273 B2
(45) Date of Patent: Jun. 5, 2012

(54) POSITIONING APPARATUS

(76) Inventor: Jeffrey Eley, Foston (GB)

( * ) Notice: Subject to any disclaimer, the term of this patent is extended or adjusted under 35 U.S.C. 154(b) by 0 days.

(21) Appl. No.: 12/736,525

(22) PCT Filed: Apr. 20, 2009

(86) PCT No.: PCT/GB2009/000994
§ 371 (c)(1),
(2), (4) Date: Dec. 27, 2010

(87) PCT Pub. No.: WO2009/127837
PCT Pub. Date: Oct. 22, 2009

(65) Prior Publication Data
US 2011/0083334 A1 Apr. 14, 2011

(30) Foreign Application Priority Data
Apr. 18, 2008 (GB) .................................. 0807088.0

(51) Int. Cl.
*G01B 5/004* (2006.01)
(52) U.S. Cl. ........................................... 33/503; 33/832
(58) Field of Classification Search .................... 33/503, 33/706, 707, 708, 832, 833, 837
See application file for complete search history.

(56) References Cited

U.S. PATENT DOCUMENTS

| | | | | |
|---|---|---|---|---|
| 4,676,649 A | * | 6/1987 | Phillips | 33/1 M |
| 5,099,583 A | * | 3/1992 | Heinz et al. | 33/707 |
| 5,388,343 A | | 2/1995 | Garau et al. | 33/503 |
| 6,315,449 B1 | | 11/2001 | Mueller | 384/12 |
| 7,636,170 B1 | * | 12/2009 | Jywe et al. | 33/503 |
| 7,779,549 B2 | * | 8/2010 | Garau | 33/503 |
| 2002/0066201 A1 | * | 6/2002 | Boge et al. | 33/706 |
| 2010/0175272 A1 | * | 7/2010 | Rudy et al. | 33/708 |
| 2010/0269362 A1 | * | 10/2010 | Bos | 33/503 |

FOREIGN PATENT DOCUMENTS
DE 102 15 188 A1 10/2003
* cited by examiner

*Primary Examiner* — G. Bradley Bennett
(74) *Attorney, Agent, or Firm* — Harrington & Smith (57) ABSTRACT

With regard to accurate determination of component size and dimension it is important to utilize positioning apparatus which can be readily and smoothly manipulated in order to determine dimension $\omega$. Generally a stylus is presented upon a carriage associated with a column is utilized for displacement between positions on a component surface. By displacement of the stylus and associated electronic devices it is possible to determine accurately the dimensions of a component. Displacement must be smooth and accurate as well as repeatable.

20 Claims, 7 Drawing Sheets

POSITIONING APPARATUS

The present invention relates to positioning apparatus and more particularly but not exclusively to positioning apparatus used for metrology for determining accurate dimensional sizing, contours and spacings using scanned data points or touch trigger contact.

It will be understood in a wide range of engineering and other industrial applications it is important to provide accurate determination of component sizes and dimensions. For example it is known to provide a height gauge which comprises a probe which extends laterally to engage parts of a component. The probe is displaced between a first contact point with the component and a second contact point with the component. A result of measuring the displacement is an accurate determination of dimensions such as apertures or gaps. It will also be understood that the probe can be arranged to take a relatively large number of contact points in order to define curvature or other shaping of a component.

In order to achieve accurate measurements it is important that the positioning apparatus is itself capable of accurate assembly and calibration for use. In particular it will be understood that the apparatus will typically incorporate an upstanding column or rail which must have a fixed and typically perpendicular relationship to a support base. Generally, the column or rail is bolted or welded to the base and in such circumstances it is important that the perpendicular relationship is accurately determined. Clearly, over a period of time this relationship may be subject to distortion in the column or rail as well as the mounting for the column upon the base. It will be understood that the mounting provides the fixing and this is located towards the bed and therefore a source of unreliable location and turning which will be multiplied by the length of the column in terms of displacement from a true and desired orientation. It will also be understood that columns tend to be rectangular which can create problems with regard to friction between the column and the assembly presenting the probe or for positioning of a component as well as with regard to a counter weight. It will be understood this friction can be limiting in terms of the sensitivity with regard to the probe engaging surface. It is also important to ensure that the probe if it can be positioned at different locations upon mountings is accurately associated with the mounting in all conditions. It will be understood that movement of the probe is generally through a carriage or cradle or otherwise on the upstanding column or rail and such movement is achieved through a cable which extends between the carriage on one side and a counterweight on the other. In such circumstances accurate means for causing smooth displacement is advantageous but over time it is difficult to achieve such accuracy. It will also be understood where bearings are utilised it is important that the bearings are appropriately dimensioned for reciprocal seats otherwise tolerance stack up can cause problems with respect to accuracy.

In view of the above it will be appreciated with positioning apparatus utilised with determining measurements and calibration of components it is important that the apparatus is both correctly designed, operated and capable of accurate set up for consistent usage. In view of the above it will be appreciated that the apparatus of particular interest with regard to aspects of the present invention relates to measuring displacement in terms of inches or millimeters as well as rectangular and polar co-ordinates and so determination of angles within components. Thus, the apparatus can be utilised as a height gauge or a vertical measuring machine.

Generally, the apparatus will include a vertical steel or iron rail mounted upon an appropriate base of a similar material. Typically the base will have an air bearing facility to allow it to be manipulated and maneuvered upon a platform table as a spacial reference. In such circumstances the platform table provides a datum or origin from which measurements can be made. Generally, a carriage is then provided to move along the rail in order to collect measurement positions by displacement. The carriage will be presented upon precision bearings typically in the form of wheels to enable accurate guiding and movement of the carriage up and down or along the rail dependent upon requirements. Generally the carriage is counterbalanced to facilitate such movement and also to limit contact pressures required. It will be understood the carriage will present a stylus or probe and this stylus or probe will be coupled to a transducer such that contact will be determined by touch. Once contact is determined the transducer will read the position and therefore provide a measurement of position on the vertical member.

In view of the above it will be understood that smoothness and accuracy of positioning as well as robustness of retention of position are important.

In accordance with first aspects of the present invention there is provided a positioning apparatus comprising a rail having an angular cross section between a first bearing surface and a second bearing surface to present a carriage, the first bearing surface engaged by a see-saw bearing element and the second bearing surface engaged by a leaf bearing element to enable locking of the carriage against a fixed bearing, the see-saw bearing defined by a cross member arrangement extending between two spaced first ball engagers having a respective first displacement adjuster to allow displacement towards the first bearing surface for centralising the carriage upon the rail, the leaf bearing comprising a leaf spring extending between two spaced second ball engagers to engage the seal bearing surface in compression.

Generally, the cross member is centrally constrained by an end and/or a central constraint to define a potential concave or convex bowing to the cross member away from the constraint as a result of extension of each first displacement adjuster to displace each first ball engager towards the first bearing surface.

Generally, the leaf spring is bowed with an apex away from the second bearing surface and a saddle adjuster to engage the apex to adjust compression of the second ball engagers towards the second bearing surface.

Generally, each second ball engager has a second displacement adjuster to displace the second ball engager towards the second bearing surface.

Typically, there are two cross members with a saddle member located between the cross members for the respective first ball engagers. Typically, the saddle members are slidable upon each cross member. Possibly, the first ball engagers and/or the second ball engagers comprise worm screws with end seats for a ball bearing. Typically, the ball bearing sits in the end seat. Generally, the ball bearing has a spigot guide extending through an aperture in the seat to align the ball bearing with the end seat. Generally, the aperture allows fluid flow to facilitate a fluid bearing. Generally, the fluid is air.

Typically, the carriage and the rail allow distribution of the fluid bearing between them to facilitate slide motion of the carriage upon the rail. Generally, the fluid bearing is defined by air flow about the first and/or second ball engagers.

Typically, the rail has a triangular cross section.

In accordance with a second aspect of the present invention there is provided positioning apparatus comprising a base to present a guide and a rail, the guide associated with the base in a fixed orientation and the rail presented upon a universal joint with the base at one end and a rail housing at the other, the rail housing engaging a distal housing secured towards an end of the guide, the rail housing engaging the distal housing through a kinematic engagement fixed by a base lock and the rail housing having a slide plate to allow lateral displacement of the other end of the rail for adjustment, the slide plate is secured by a lateral lock.

Normally, the lateral displacement is in two dimensions perpendicular to each other.

Generally, the universal joint comprises a hemispherical or ball end to the rail and a hemispherical seat. Typically, the base lock comprises a clamp down plate to fix engagement between the hemispherical or ball end and the hemispherical seat.

Generally, the kinematic engagement is provided by face to face roller to ball engagement. Typically the face to face roller to ball engagement comprises at least three associations of parallel roller pairs and an opposed ball bearing. Generally, at least two pairs of rollers are configured substantially perpendicular to each other.

Generally, the other end of the rail engages the rail housing through a swivel end.

Generally, the kinematic engagement allows relative displacement along one axis.

Generally, the lateral lock comprises a lock plate presented upon fasteners extending through the slide plate and engaging the rail housing and the distal housing to force engagement at the kinematic engagement.

Generally, the base lock and the lateral lock are separately engageable.

In accordance with a third aspect of the present invention there is provided positioning apparatus comprising a rail to present a carriage with a counterbalance within a hollow passage, the passage and the counterbalance having a limited gap between them to allow slide movement, the counterbalance having surface apertures towards the passage, the surface apertures extending from an end aperture through an internal conduit within the counterbalance whereby displacement of the counterbalance in the hollow passage stimulates fluid flow of a fluid in the hollow passage through the surface apertures to provide a bearing for the counterbalance within the hollow passage.

Generally, the hollow passage is substantially closed.

Typically, the hollow passage is provided within the rail.

Possibly, the internal conduit and/or the end aperture incorporate a one way valve or restriction for fluid flow in one direction. Typically, the counterbalance incorporates end apertures at either end of the counterbalance.

Generally, the carriage is associated with the counterbalance through a cable over a pulley.

Generally, there is a plurality of surface apertures. Typically, the surface apertures are spaced radially and/or longitudinally along the counterbalance. Possibly, the surface apertures are provided with different sizes and/or distributions for distribution of fluid flow through the surface apertures. Typically, the fluid is air.

Generally, the counterbalance is provided with sufficient mass to stimulate a desired fluid flow pressure through the surface apertures to define the bearing between the counterbalance and the hollow passage. Possibly, the apparatus incorporates a pressure release valve to limit pressurisation within the hollow passage due to displacement of the counterbalance.

In accordance with fourth aspects of the present invention there is provided a positioning apparatus comprising a carriage upon a rail, the carriage presenting a probe having a central axis extending through a shank to a stylus, the carriage having a plurality of probe holders at fixed spaced positions relative to each other, each probe holder having a key feature reciprocal to a shank feature of the shank to ensure consistent presentation of the probe in each probe holder in terms of consistent orientation of eccentricity of the stylus relative to the central axis.

Typically, the shank feature comprises a chamfer. Generally, the stylus comprises a substantive sphere. Typically, the stylus is formed from a plastic or resin or glass or metal.

Generally, the holder includes an aperture for the shank and the aperture has the key feature in the form of a peg to extend across the aperture to engage the shank feature.

In accordance with fifth aspects of the present invention there is provided a conical element associated with a conical seat, one or other of the conical element and the conical seat having a spindle extending to a pulley for a cable weighted at each end, one or other of the conical element and the conical seat having spaced magnetic elements and the other of the conical element or the conical seat electromagnetically inducible to generate Eddy current association therebetween as a result of drive rotation of one or other of the conical element or the conical seat whereby the driven conical element or conical seat is followed by the other.

Generally, the cable is substantially balanced with weights at each end.

Possibly, the conical element and the conical seat are presented upon a common spindle axis.

Possibly, the conical element and the conical seat are laterally displaceable relative to each other upon the common spindle axis to vary the gap between them.

Typically, the magnetic elements are permanent magnets. Generally, the magnetic elements are embedded into the conical seat or the conical element.

Possibly, non-conductive bearing elements are provided between the conical element and the conical seat to define a minimum gap between the conical element and the conical seat. Possibly, the bearing elements are formed from a plastics material.

Aspects of the present invention will now be described by way of example only with reference to the accompanying drawings in which.

As indicated above positioning apparatus and in particular metrology apparatus utilised to determine height and dimensions in a component depends upon contact by a stylus generally presented upon a shank from a carriage which can move upon a rail. The positions of the stylus can therefore be determined by variations in the position of the carriage upon the rail as deduced by a transducer or other sensor device. In such circumstances it will be understood that positioning apparatus is dependent upon correct assembly and general calibration. One feature which requires calibration is clearly the rail upon which the carriage is presented. Generally, the rail will be substantially vertical and extend from a base which itself may be presented upon a platform table. The platform table can be made from a stable and robust material such as granite appropriately lapped and smoothed to provide a fixed datum upon which the remaining components of the measuring and positioning apparatus can be presented. In any event, it is important that the rail is accurately projected. Traditionally the rail has been secured to the base by a weld or other mounting such as bolts. Unfortunately it will also be understood the carriage as well as contact with the component to be measured will result in stressing particularly as the carriage moves further away from the base and therefore fixed mounting point. The carriage will have weight and the lever effect at the distal end of the rail may cause slight deflection from the desired vertical. Thus, it is desirable to provide a carriage which can be accurately and smoothly moved along the rail and to provide means to avoid stressing as well as initial lack of calibrated consistency with regard to the positioning apparatus.

Figure 1:
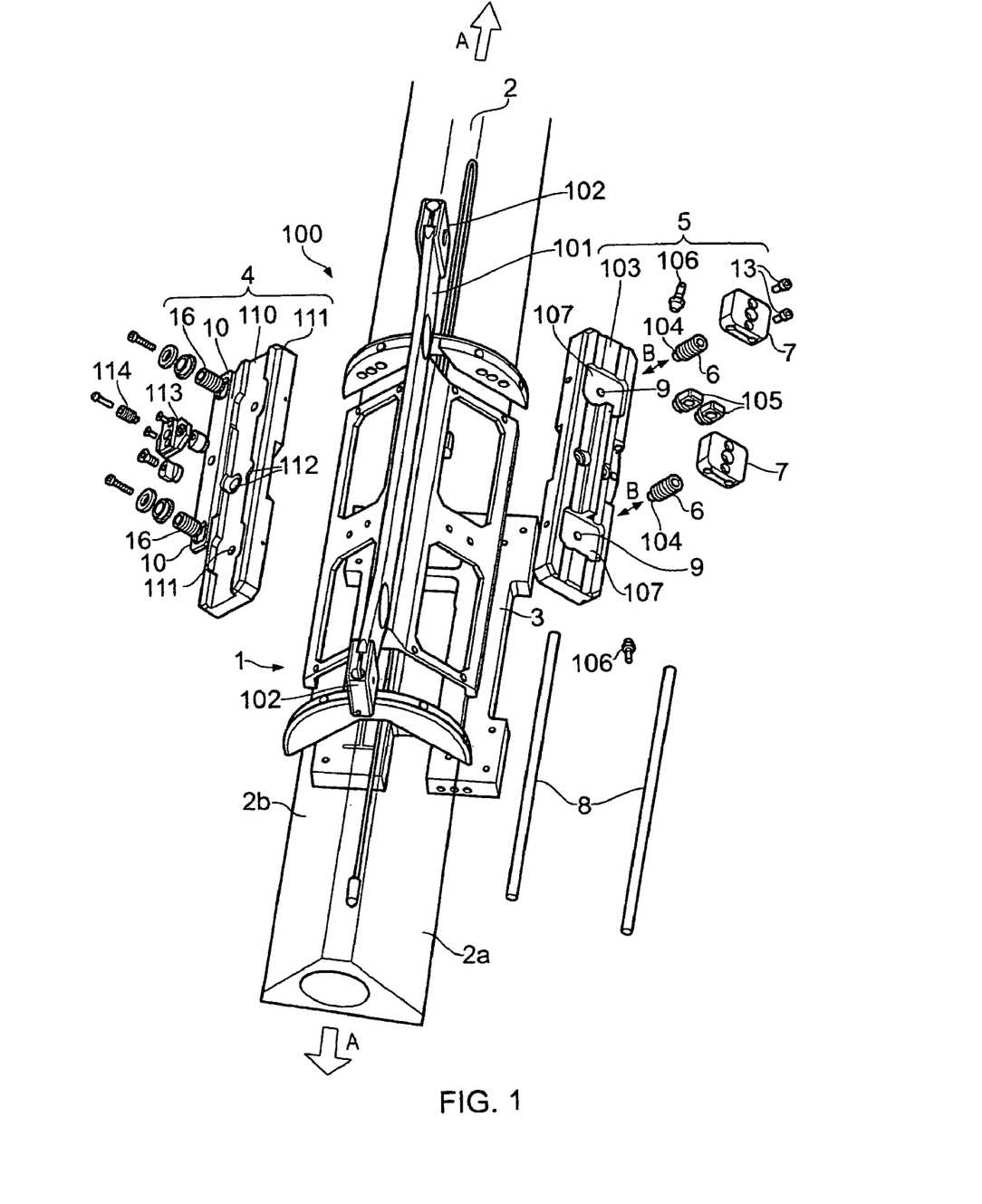
FIG. 1 is an exploded view of a positioning apparatus in accordance with first aspects of the present invention.

FIG. 1 provides an exploded view of a positioning apparatus 100 in accordance with first aspects of the present invention. The apparatus comprises a carriage 1 which presents respective first bearing assembly 5 and second bearing assembly 4. The carriage 1 is generally secured about a rail 2. Generally the rail 2 presents a first bearing surface 2a and a second bearing surface 2b in an angular orientation to each other for engagement respectively by the first bearing assembly 5 and the second bearing assembly 4. The bearing assemblies 4, 5 act upon the rail 2 to generally either allow slide motion by creating an air or fluid bearing or clamping motion against a fixed bearing assembly 3 opposing the bearing surfaces 2a, 2b of the rail 2.

In normal operation as indicated the carriage 1 will slide along the rail 2. This slide motion will be achieved in accordance with preferred aspects of the present invention through an air bearing created against the surfaces of the rail 2. The air bearing will be created by presenting air against the surface of the rail 2 typically through the bearing assemblies 4, 5 as well as the bearing assembly 3. The air will be compressed in order that the carriage 1 can move smoothly upon the air along the rail in the direction of arrowheads A. Such movement will be through a cable about a pulley as described later.

It will be noted that the carriage 1 generally incorporates a probe presentation arm 101 having two probe holders 102, one at each end to present probes as will also be described later. It will be understood that it is movement of the carriage 1 and therefore the probes (not shown) in the holders 102 which determines measurement whether that be of height or other dimensions with the apparatus 100 in use. Generally, the probes will move until contact is made at which point slide movement will stop. In such circumstances the slide movement should be as frictionless as possible and therefore provision of an air bearing has great advantages. Once the slide movement has stopped as indicated a sensor in the form of a transducer can be utilised in order to determine position. It will also be understood that advantageously the carriage 1 can be locked in position. This locking in position should be robust and sufficient to enable accurate maintenance of position. It will also be appreciated that the bearing arrangements 4, 5 should attempt to achieve consistency with regard to presentation of the carriage 1 upon the rail 2 to avoid spurious tilt which may provide marginal variations in the presentation of the probes and therefore dimensions determined by the apparatus 100 in use.

As indicated above generally the rail 2 in accordance with aspects of the present invention will have a generally triangular configuration and cross section to allow a similarly shaped carriage 1 to encapsulate the rail 2 in use. Angular orientation between the bearing surfaces 2a, 2b allows provision of a centralised slide motion as well as lock in accordance with first aspects of the present invention. This lock is against the fixed bearing 3. In the embodiment illustrated in FIG. 1 the fixed bearing 3 acts against a substantially flat surface but it will be understood that other shapes including curved or ribbed or channelled surfaces can also be utilised where desirable. It is also desirable that the rail 2 substantially has a flat surface and therefore generally air or other fluid is used to create the bearing and will be presented through apertures in the bearings 3, 4, 5.

The air bearings will generally be created through apertures in seats for ball engagers. In such circumstances the air passes through the apertures and onto the surface of the rail 2 in order to provide an air bearing and suspension of the carriage in use.

In accordance with first aspects of the present invention as depicted in FIG. 1 the carriage 1 is essentially maintained by utilisation of a first bearing arrangement or assembly 5 which acts in a see-saw mode and a second bearing arrangement or assembly 4 which acts in a leaf spring mode.

The first bearing assembly 5 comprises a chassis 103 in which bearing seats 9 are presented at spaced locations. The bearing seats 9 are engaged by ball bearing engagers comprising a ball bearing presented upon the end of adjusters 6. In such circumstances the ball bearings sit in seats 104 at each end of the adjuster 6 to engage the first bearing surface 2a.

The adjusters 6 are presented in saddles 7 which in turn are secured upon cross members 8. Each saddle 7 can slide along the cross members 8 to allow adjustment. The cross members 8 are typically constrained either at their ends or centrally by constraint elements 105 mounted to the chassis 103. In such circumstances the adjuster 6 can be adjusted in the direction of arrowhead B to present the ball bearings in the seats 9 with a see-saw effect. The cross members 8 are robust or may be slightly flexible to bow in an outward concave orientation away from the constraints or undergo a convex bend dependent upon conditions.

In use generally an adaptor 106 is used to present a fluid such as compressed air to wells 107 incorporating the seats 9. In such circumstances the compressed air will effectively lift the saddles 7 so removing the ball bearings from the seats 9 and allowing air to flow through apertures in the seats 9 onto the first surface 2a to generate an air bearing. It will be understood that the cross members 8 in such circumstances will flex in a see-saw fashion but through shape memory have a bias to return the ball bearings into engagement with the seats 9 in order to close the apertures and also engage the surface 2a for a clamping action.

The second bearing assembly 4 comprises a chassis 110 in which seats 111 are provided at spaced locations as well as further seats 112 intermediate thereof. These seats 111 are engaged by adjusters 16 which present ball bearings to the seats 111. The adjusters 16 are presented upon a leaf spring 10. The leaf spring 10 is itself secured through a fixed saddle 113 engaging the seats 112. The fixed saddle 113 itself can be adjusted by an adjuster 114 to vary engagement with the seats 112 as well as a spring bias provided by the leaf spring 10. In use ball bearings presented to the seats 111 plus possibly seats 112 engage the second bearing surface 2b in order to create a lock pressure or where desirable an aperture through which fluid flow can be presented to provide an air bearing or against the second bearing surface 2b.

In view of the above it will be understood that the bearings 3, 4, 5 all act in unison in terms of operation with regard to slide motion for the carriage 100 as well as a locking action. With regard to the first bearing 5 the cross members 8 as indicated can be constrained either centrally or towards the end of the chassis 103 in order that through distortion of the cross members 8 the ball bearings in the seats 9 can be displaced or forced into engagement electively for creation of an air bearing or locking of the carriage 1 upon the rail 2. Similarly, the leaf spring 10 when there is no through pressure will force the ball bearings into engagement with the rail 2 for a locking action whilst when fluid pressure in the form of air is presented the apertures in the seats 111, 112 will open releasing the clamping action and so allowing the carriage to slide along the rail 2. The fixed bearing 3 includes no dynamic elements and in such circumstances generally simply incorporates apertures through which fluid pressure can be presented in order to provide an air bearing against its opposed surface of the carriage 2. This flow will be stopped when locking of carriage position is required.

In terms of operation it will be understood that calibration is required. In such circumstances generally the carriage 1 will be located upon the rail 2. The first bearing assembly 5 will then be deployed. In such circumstances the adjuster 6 will be adjusted at either end of the bearing assembly 5 in order to substantially centralise the carriage 1 upon the rail 2. As indicated the adjuster 6 presents ball bearings and are themselves presented upon saddles 7. The saddles 7 can slide along the cross members 8 which act as guide bars anchored typically at the ends of the chassis 103 and possibly centrally as indicated above. The cross members 8 stabilise saddle 7 movement and so prevent rotation whilst the adjusters 6 make precise contact with regard to ball bearings in the opposed typically spherical seats 9. In such circumstances the adjusters 6 have a self centring effect with regard to presenting the ball bearings in the seats 104 to the aperture seats 9.

Once centralisation has been achieved the second bearing assembly 4 is arranged to act upon the second bearing surface 2b. In such circumstances the seats 111 at either end of the chassis 110 have through their adjusters 106 a ball bearing engaging the surface 2b. The adjusters 16 along with adjusters 6 and any other adjusters for the fixed bearing 3 are displaced until all ball bearings presented through seats and apertures in those seats are in engagement with the rail 2.

The second bearing assembly 4 as indicated has a leaf spring 10 which has attached at each end the adjusters 16. The centre of the spring 10 has a further ball seat adjuster 114 mounted upon the fixed saddle 13. When the adjuster 114 is displaced spring pressure is presented to the adjusters 16. This spring pressure retains the adjusters 16 and in particular the ball bearings presented upon ends of those adjusters 16 in engagement with the seats 111 in order to load the carriage into compression with the rail 2 when fluid pressure is not presented and so an air bearing is not created.

Each adjuster 6, 16 typically incorporates a central fixing hole through which a set screw can act upon the ball bearing for locking and bearing control. Thus, adjustments can be made between each adjuster 6, 16 and a bottom of each seat 9, 111, 112. Such an arrangement locks together the apparatus 100. It will also be understood that generally fixings 13 will be utilised upon the saddle 7 in order to lock the saddle 7 slide position on the cross members 8.

When compressed air is fed through the bearings 3, 4, 5 as indicated the carriage 1 will be suspended and can move substantially smoothly and frictionlessly along the rail 2. Typically the air supply can be terminated such that the carriage 1 is then locked or fixed in position by engagement of the bearing assemblies 3, 4, 5 with the rail 2. Such locking is through spring loaded triangulation of forces effected through the respective bearings arrangements 3, 4, 5. Once the compressed air is terminated the carriage 1 and bearings 3, 4, 5 are urged into contact by the leaf spring 10.

By the above apparatus 100 it will be appreciated that the carriage 1 through the adjusters 6, 16 in particular is pre-loaded by a spring force created by the spring 10. In such circumstances a constant load is provided between the fixed rail 2 and the moving carriage 1. By ensuring that the forces are evenly and naturally distributed, typically by triangular presentation between the interacting parts, a more efficient locking and presentation of the carriage 1 is achieved.

It will be appreciated that the bearing assembly 3 is fixed and in such circumstances the gap between the carriage 1 and the rail 2 can be adjusted simply by the adjustments through the adjusters 6, 16 in the respective bearing assemblies 4, 5.

In accordance with first aspects of the present invention once the apparatus 100 is set it will be understood that further adjustment can be made through the adjuster 114 acting upon the spring 10 to vary loading in use.

By provision of a sliding saddle 7 it will be understood that essentially the male ball seat adjusters with ball bearing end as engagers are provided against the essentially female seats 9. The saddles 7 incorporate the lock fastenings 13 to maintain the final position for the adjusters 6 on the cross members 8. The shape and configuration of the saddle 7 ensures simultaneous lock of the adjusters 6 as well as the position of the saddle 7 upon the cross members 8. Once locked the assembly 100 is stable with no unwanted movement or instability.

When the carriage 1 is desired to be locked in a static position this can be done by simply switching off the air supply. The consequence of this is that the spring loading of the combination of assemblies 3, 4, 5 will allow firm contact with the rail 2 and so lock position.

Figure 2:
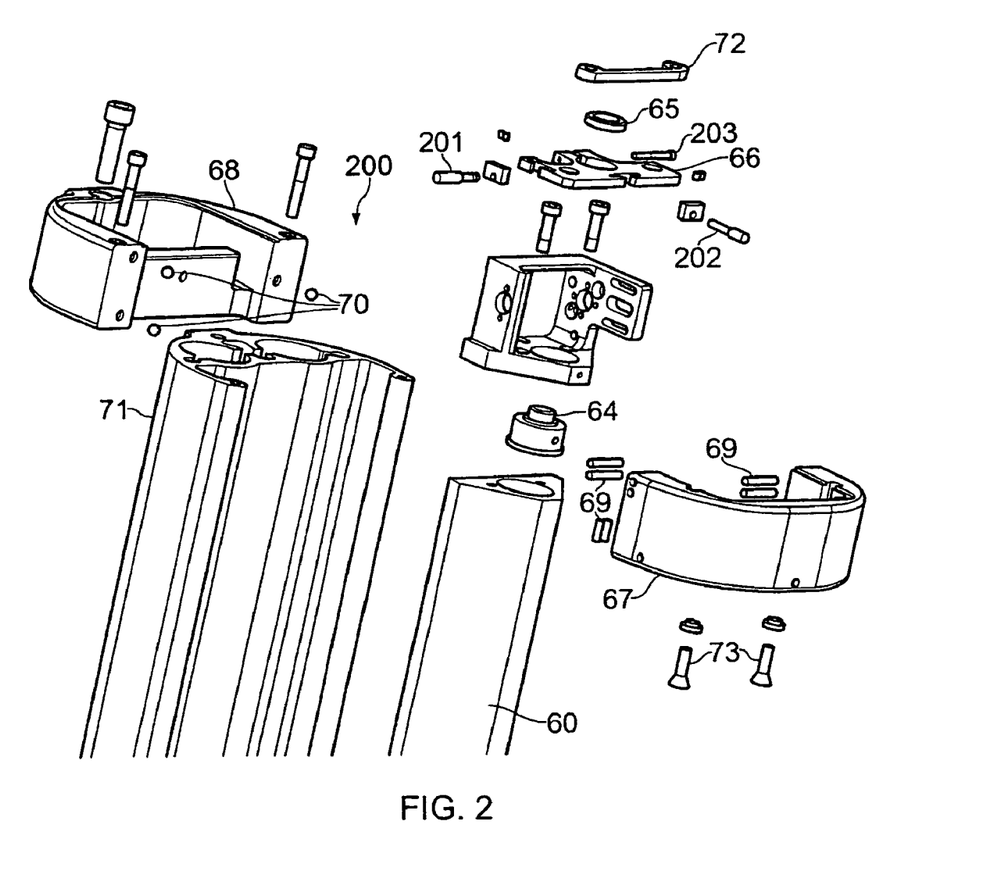
FIG. 2 is an exploded pictorial representation of a distal end of a positioning arrangement in accordance with second aspects of the present invention.
Figure 3:
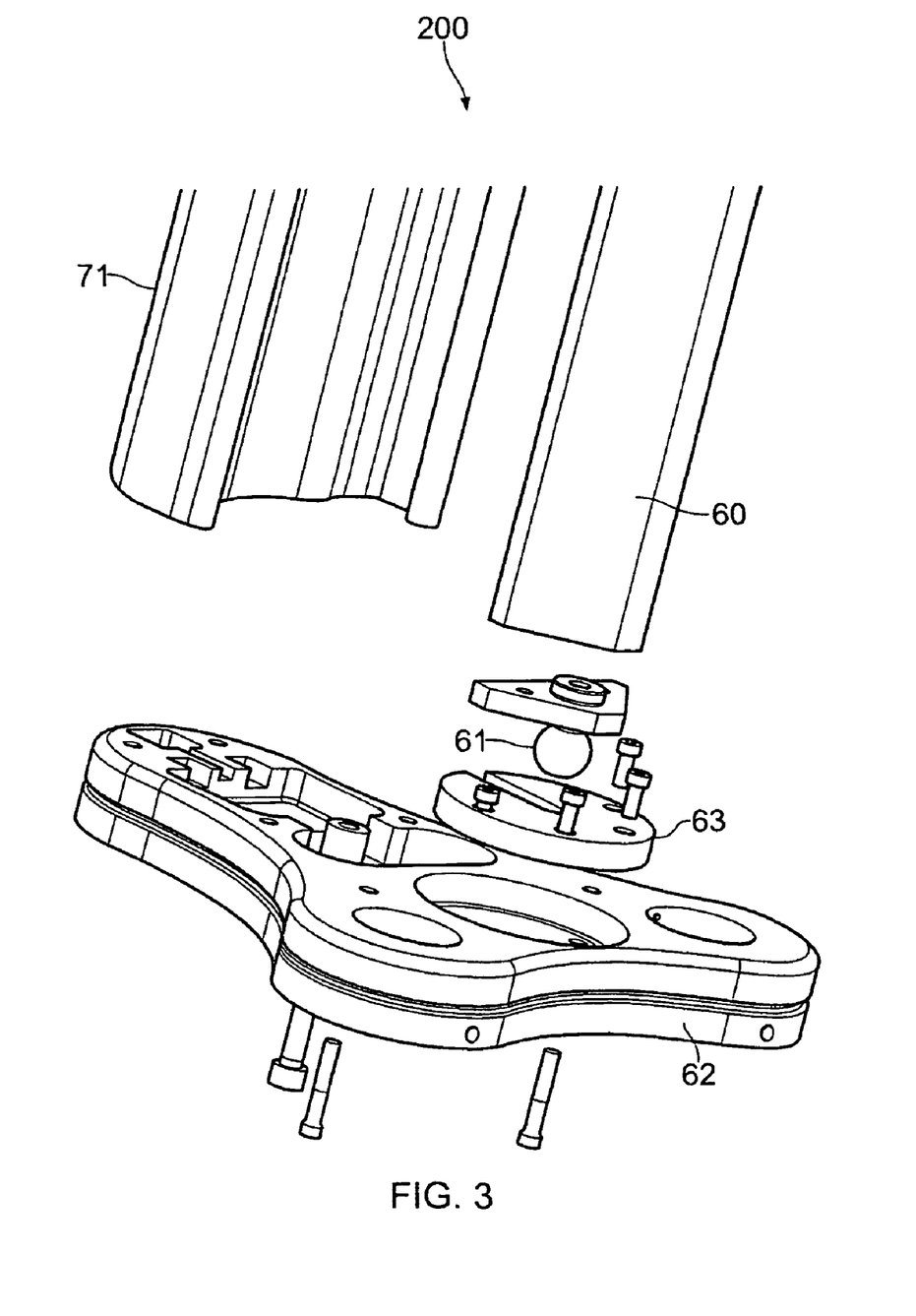
FIG. 3 is an exploded view of a base end of the arrangement as depicted in FIG. 2.
Figure 4:
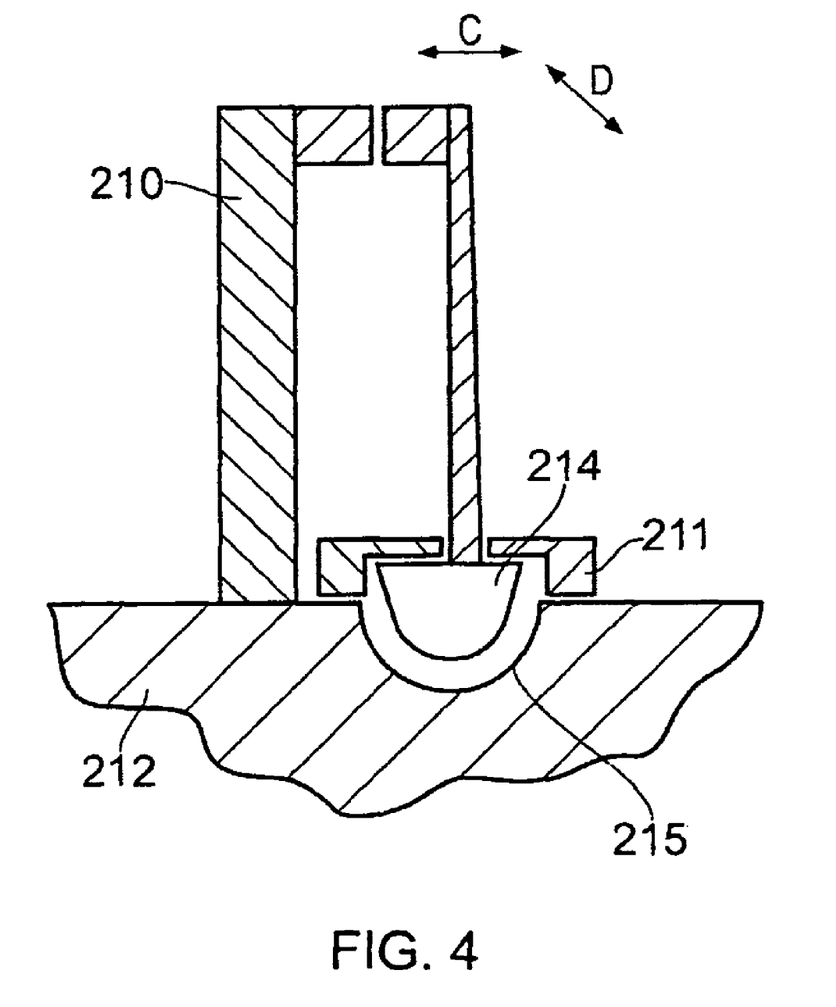
FIG. 4 is a schematic perspective illustration of a positioning arrangement in accordance with second aspects of the present invention.

As indicated above accurate positioning of the rail 2 is important in order to ensure accurate determination of the variations in position and therefore sizing. Previously the rail was presented from a base utilising a welded joint or bolt combination. Ideally the guide function of the rail should be isolated from the load carrying function with regard to the carriage. In accordance with second aspects of the present invention as depicted in FIGS. 2 to 4 a rail 60 is presented adjacent to a guide 71 robustly fixed typically through three bolts to a base. The guide 71 can be formed from a substantially rigid component without consideration with regard to needs to provide a rail for slide association with a carriage. FIG. 2 provides an exploded view of a distal end of the guide 71 and rail 60, FIG. 3 provides an exploded view of a base 62 end of the rail 60 and guide 71 and FIG. 4 is a schematic illustration with regard to adjustment in accordance with second aspects of the present invention.

As indicated the vertical rail 60 is generally secured to the base 62 through a universal joint. The universal joint takes the form of a ball ended hemisphere 61 which sits in a seat formed in the base 62. In order to clamp location generally a clamp plate 63 is provided which will engage parts of the rail 60 to maintain the position for the joint created by the joint end 61. The function of the universal joint created by the ball end 61 is to allow adjustment of the rail 61 into its desired vertical configuration.

The guide 71 as illustrated comprises a substantive and very rigid section. The guide 61 may be formed from an extrusion and as illustrated will typically have a channel construction for rigidity. The guide 71 will be secured to the base 62 through generally at least three bolts to ensure its orientation. The shape or configuration is optimised with regard to rigidity as there is no consideration with respect to the necessity for provision of the capability for carriage movement and loading upon the guide 71 is avoided. The guide 71 provides a datum presentation within an arrangement 200 in accordance with a second aspect of the present invention.

As depicted in FIG. 2 at the distal end of the rail 60 and guide 71 respectively a rail housing 67 and a distal housing 68 are provided. The rail housing 67 presents roller elements 69 in the embodiment depicted. Typically the roller elements 69 are parallel roller pairs and at least two pairs are substantially perpendicular to each other. In use the rollers 69 will be in face to face engagement with ball bearings 70 in the distal housing 68 in order to create a kinematic engagement. As indicated the guide 71 is rigid and robustly presented in a vertical orientation. In such circumstances consistency is provided when the rollers 69 are in engagement with the ball bearings 70 in a face to face relationship.

The rail housing 67 is kinematically located relative to the distal housing 68. The housings 67, 68 create such kinematic location through the three pairs of typically hardened steel rollers 69 in one housing 67 and opposed hardened steel locators 70 in the form of ball bearings in the housing 68. In such circumstances when the rollers 69 and locators 70 are in engagement the rail in one dimension can only achieve one position and this position is repeatedly achievable. It will be understood that there is no load transfer across the locators to the rollers 69 and therefore distortion by loading is avoided.

A top end of the rail 60 incorporates a location swivel 64. This location swivel 64 engages a bearing 65 to allow full spherical rotation. The outer face of the bearing 65 is generally located within a slide plate 66 which is designed to allow slide or bi directional lateral movement in the rail housing 67, that is to say side-to-side and front-to-back.

As the guide 71 acts as a rigid element which can be accurately located and typically secured through bolts or otherwise to the base 62 it will be understood that this plane for orientating the rail 60 is readily achieved Clearly, it is also necessary to ensure that the rail 60 is also in the desired orientation in the lateral dimension. In such circumstances the rail housing 67 incorporates the slide plate 66 which allows controlled movement in two directions at 90° to each other. This enables precise perpendicular orientation to be achieved by the rail 60 in two dimensions.

Generally, once a perpendicular is achieved a clamp plate 72 will be located relative to the slide plate 60 in order to lock position for the slide plate 66. The clamp plate 72 is secured through screws 73.

It will be understood that once the slide plate 66 is clamped in position within the housing 67 it is possible to disengage the kinematic engagement provided by the rollers 69 and locator ball bearings 70. Thus, the clamping action provided by the clamp plate 63 (FIG. 3) can be released to allow pivot about the ball end 61 such that access can be provided to the rear of a carriage secured upon the rail 60. Once maintenance or access to the carriage is no longer required it will be understood that the arrangement can be returned to an upright or other configuration as desired with the kinematic engagement between the locator 70 and the roller 69 whilst the slide position for the slide plate 66 is retained. The effect of the locators 70 as ball bearings in the roller 69 will be to return through the kinematic engagement the rail 60 back into its perpendicular condition in two directions. If the ball bearing locators 70 do not engage the roller 69 such misalignment will be understood and appreciated and the assembly will not be locked by the lock created by the clamp plate 63.

By second aspects of the present invention as depicted in FIGS. 2 to 3 it will be appreciated that the rail 61 acting as a column upon which a carriage is presented has no stress imparted to it through the clamping mechanism. Adjustment is achieved through the kinematic engagement between the locators 70 and the rollers 69 in the housings 68, 67.

In terms of adjustment for the slide plate 60 it will be appreciated that the plate 60 will typically have adjusters 201, 202, 203 for the slide plate to allow manipulation of the rail 60 about the swivel association created by the swivel end 64 and the bearing 65. Once perpendicularity is achieved as indicated above a clamp plate 72 will lock the position for the plate through fastenings 63. Once the lateral position is achieved abutment between the locators 70 and the rollers 69 will provide consistency of engagement between the housing 67, 68 and therefore consistency of presentation of the rail 60 in a desired orientation.

FIG. 4 provides a schematic illustration of adjustment of a positioning arrangement in accordance with a second aspect of the present invention. Thus, a guide 210 is presented upon a base 212 which in turn is supported upon a table platform. As indicated above the guide 210 is robust and rigid in terms of material cross section and shaping. The guide 210 is secured to the base 212 through bolts or other appropriate fixings and therefore provides a high degree of stability within the positioning arrangement. A rail 213 is secured through a universal joint created by a ball end 214 and a hemispherical seat 215. Thus, the rail 213 can be displaced in the direction of arrowheads C, D in order to generate perpendicularity. Generally, initially the rail 213 will be positioned perpendicularly by adjustment in the direction of arrowheads D utilising the slide plate as described above. Once such perpendicularity is achieved the rail 213 will be presented to the kinematic engagement created by rollers and balls as described above and adjustment again made through the slide plate for perpendicularity in the direction of arrowheads C. Once such perpendicularity is achieved the slide plate will be locked and a base locked about the junction created by the ball end 214 and seat 215 by a lock plate 211. In such circumstances repeatability with regard to location against the kinematic engagement is retained by the slide plate adjustment initially into such kinematic engagement and then the slide plate being retained for consistency.

As indicated above with regard to positioning and measuring apparatus it is important that movement is smooth and consistent. In order to achieve appropriate engagement between a probe and a surface to be measured generally minimalisation of contact pressure is advantageous. Thus, typically a carriage will be associated through a Boden cable or otherwise with a counterweight. The cable will extend over a pulley such that contact pressures can be reduced and if possible almost eliminated. The counterweight will move within a hollow typically located within the guide rail for the carriage. Care must be taken that the counterweight moves smoothly otherwise jerky or uneven movement of the carriage itself may result.

Figure 5:
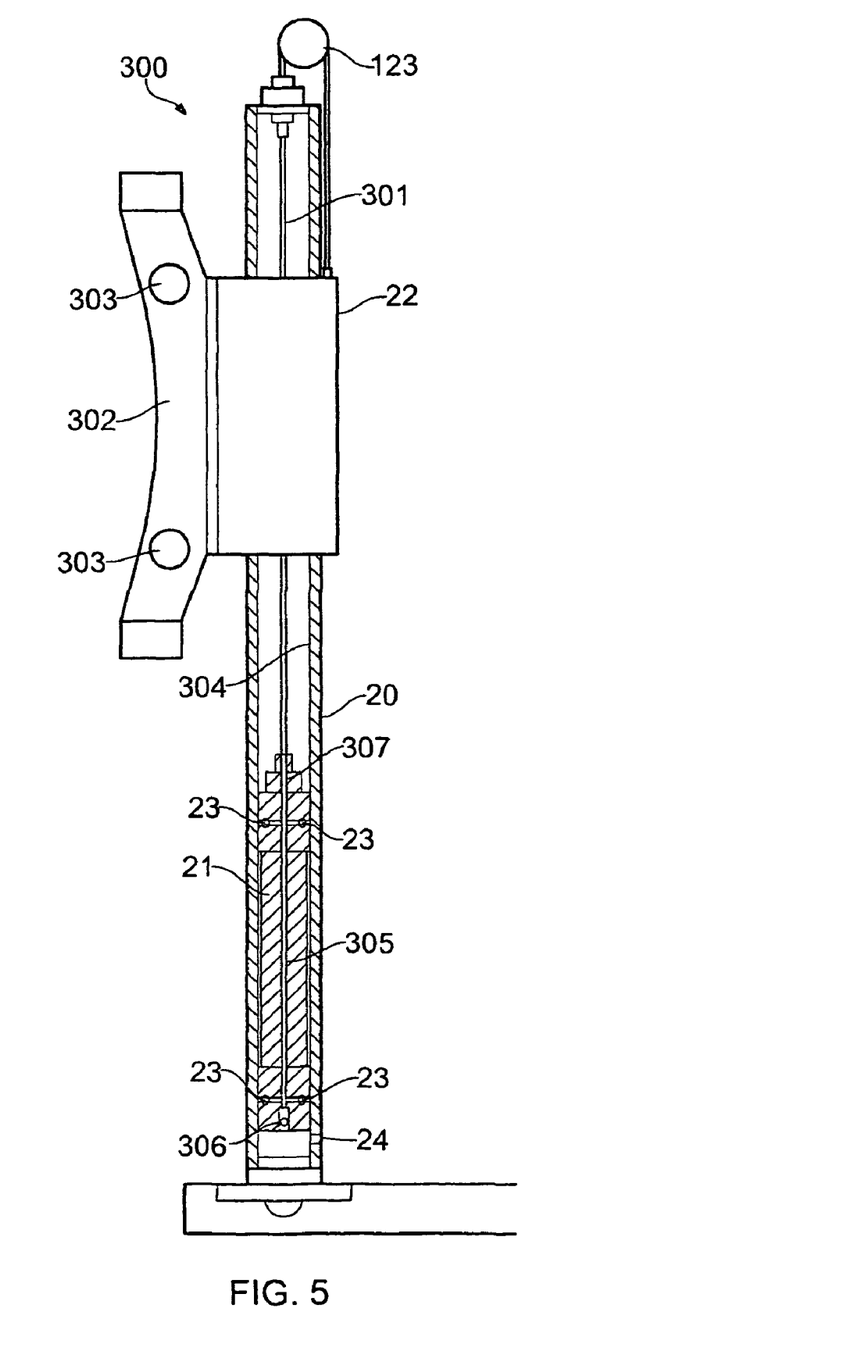
FIG. 5 is a pictorial cross section of a positioning arrangement in accordance with third aspects of the present invention.

In accordance with third aspects of the present invention as depicted in FIG. 5 a counterweight 21 is secured to a carriage 22 through a cable 301 in an arrangement 300. The carriage 22 incorporates a probe holder arm 302 with probe holders 303. In such circumstances it will be appreciated that upward and downward movements of the carriage 22 are reciprocated by movements by the counterweight 21 within a hollow passage 304. The counterweight 21 in such circumstances slides past opposed surfaces of the passage 304. In accordance with aspects of the present invention surface portions of the counterbalance 21 incorporate surface apertures 23 through which a fluid typically captured within the passage 304 can pass. In such circumstances as this fluid is pressurised by movements of the counterweight the fluid is forced through internal conduits 305 from end apertures 306, 307 and out of the apertures 23 in order to create an effective air bearing between the counterweight 21 and opposed surfaces of the passage 304. Thus the counterweight 21 will run smoothly within the passage 304 and therefore create an almost frictionless movement about the pulley 23 and so the carriage 22 in use. Clearly, there will be some friction due to the cable acting upon the pulley 123 but problems with regard to movement of the counterweight 21 will be reduced.

It will be understood that the counterweight 21 can move upwards as well as downwards within the passage 304. In such circumstances it may be that the conduit 305 or apertures 306, 307 include one way valves or constrictions in order to enable utilisation of the fluid and in particular air pressurisation within the passage 304 in use. Furthermore, in order to prevent over pressurisation within the passage 304 and therefore potential problems with regard to inconsistency of the movements of the counterweight 21 within the passage 304 a vent 24 can be provided. It will be understood that essentially the passage 304 is closed at both ends and in such circumstances there will be a limit with regard to flow through the exit surface apertures 23 and so limitation with regard to the rate of movement of the counterbalance 21.

Movement of the carriage 22 and counterbalance 21 will be through driven movement of the pulley 123. However, where the carriage 22 itself is driven or pulled it will be appreciated that the resistance caused by limiting flow rate through the apertures 23 may result in stretching or variability with regard the tension within the cable 301. Such variations may cause inconsistency with regard to measuring. By providing a vent 24 limitation with regard to such problems may be achieved. Furthermore, the vent 24 may incorporate a pressure control valve to control the fluid or air pressure within the passage 304.

Generally, the passage 304 as indicated is provided within a rail utilised for guiding the carriage 22. The passage 304 will extend the full length of the rail and will be sized such that the counterweight 21 closely matches the diameter of the passage 304 but is not in interference with that passage. In such circumstances a gap is created which as indicated provides regulation with regard to pressurised fluid flow whilst achieving effectively an air bearing between the counterweight 21 and the passage 304.

Movement of the counterweight 21 inside the passage 304 is allowed to generate air pressure by as illustrated sealing or at least constricting the ends of the passage 304. In such circumstances through the conduit 305 within the counterweight 21 pressurised air distribution through the exit surface apertures 23 creates an air bearing. The apertures 23 as illustrated will typically be spaced evenly or as appropriate radially about the circumference or peripheral surface of the counterweight 21. Furthermore, a number of surface apertures 23 may be positioned at spaced positions either regularly or as required along the length or longitudinally within the weight 21. By creating a more or less frictionless suspension of the balance of weight between the carriage 22 and the counterweight 21 it will be understood that contact over pressures created by probes presented in the holders 303 may be reduced. It will be understood that any touch or contact pressure by the probes may distort that probe and therefore provide an error with regard to measurement consistency. Such error may by distortion of the probe, whether elastic or permanent, as a result of friction impeding suspension of the movement of the carriage 22 and so requiring force to overcome the friction resistance.

It will be appreciated generally the surface apertures 23 to present the pressurised fluid or air flow for a bearing will normally be evenly distributed along the length of the counterweight 21. However, in some circumstances it may be desirable to provide different sized or distributions of surface apertures 23 in order to create a desired bearing between the weight 21 and the passage 304.

It will be understood that consistency is a principal requirement with regard to measurement and positioning devices and apparatus. Nevertheless, particularly with regard to metrology it is also understood that probes will typically have micro eccentricities which should be understood or eliminated by cancellation by consistent orientation of the eccentricity when two or more measurements taken. However, in some circumstances it is advantageous to provide a carriage which has a probe presenting arm with two or more spaced locations for probe holders. In such circumstances the measuring range for the positioning or measuring apparatus can be extended.

Figure 6:
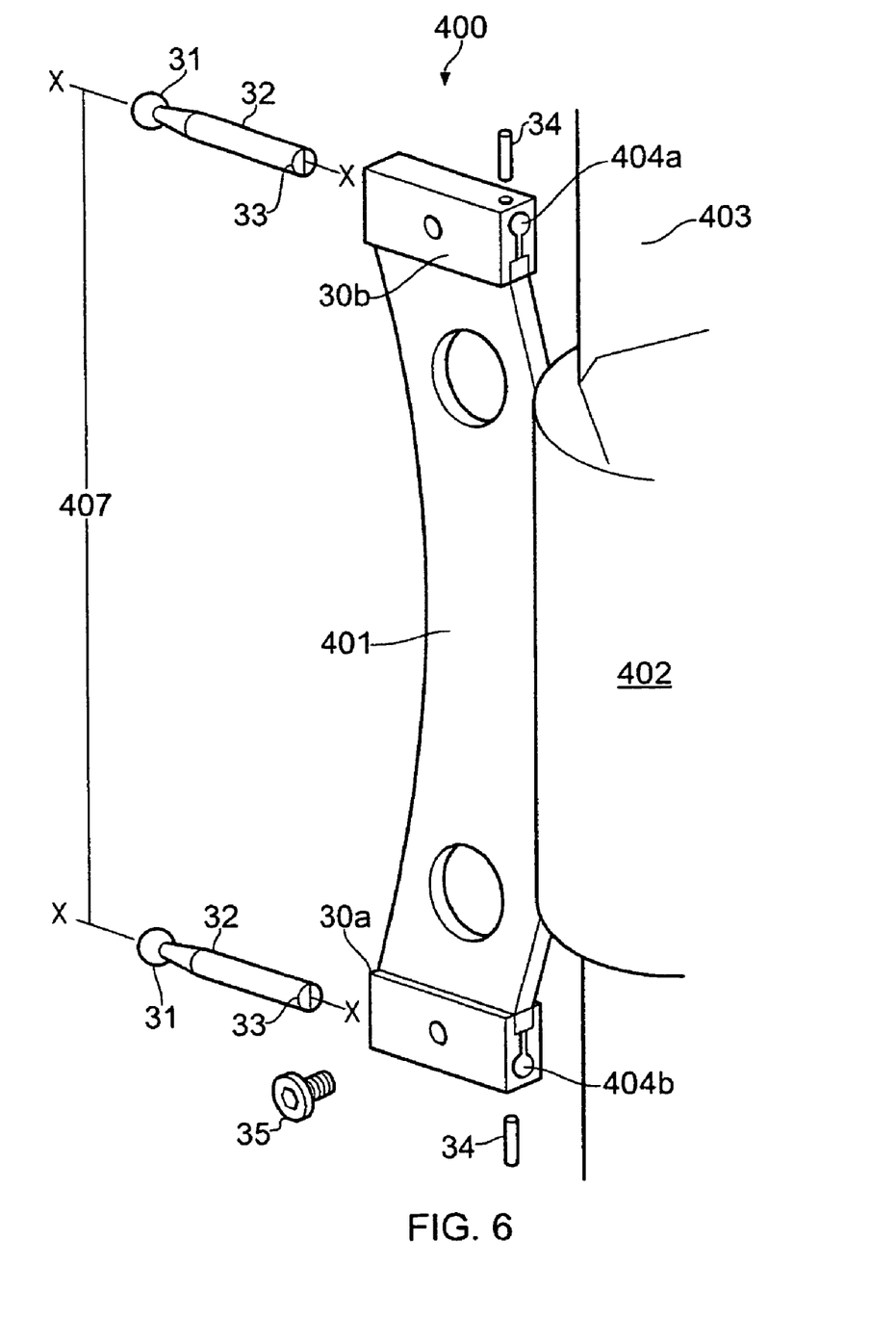
FIG. 6 is a pictorial illustration of a positioning apparatus in accordance with fourth aspects of the present invention; and, FIG. 7 is a pictorial part cross section of a positioning apparatus in accordance with fifth aspects of the present invention.

FIG. 6 provides a schematic illustration of a probe presenting arm 401 in an arrangement 400 consistent with a fourth aspect of the present invention. The arm 401 is secured to a carriage 402 which will move upon a rail 403 as described above. The arm 401 incorporates two probe holders 30 in order to present probes comprising a shank 32 and a stylus 31. It will be appreciated that two different probes may be installed into the holders 30 through a mounting aperture 404 in each. Unfortunately different probes in terms of their shanks 32 and in particular stylus elements 31 will have differing eccentricities radially along a probe axis X-X. These eccentricities will relate to displacement radially from the axis X-X. In such circumstances unless the probe is consistently presented and then that consistent probe located in the same aperture 404 in the same orientation these eccentricities will result in differences and errors in measurements taken. For example it will be understood that the stylus elements 31 will typically be formed from a plastic or resin or metal or glass and attempt to adopt a spherical aspect. However, initially it is not possible to make a perfect sphere and secondly over the course of usage it is possible that the stylus 31 may become flattened upon certain surfaces even if formed from a hard glass or metal or simply the mounting to the shank bent. Although contact pressures will not be high it is possible that such flattening or bending would be significant with some high accuracy measurements. Similarly, with regard to the shanks 32 it will be understood the shanks 32 may become bent or distorted through contact pressure during use as well as initially.

In terms of measurement as indicated above the arm 401 incorporates the two holders 30. In such circumstances the holders 30 generally define through the apertures 404 centres for each holder 30. These centres should be consistent with the axis X-X of the probe. In such circumstances by first measuring with a probe in the lower holder 30a one extremity of measurement can be achieved. Whilst to increase the measurement range provision of a probe in an upper holder 30 will allow further measurements to be taken. As indicated ideally the same probe should be used and consistency of orientation within the holders achieved. The probes are generally held within the holders by presenting the shank 32 in the apertures 404 and then securing with a fastener 35. Adjustment elements 34 can also be utilised to provide two point location.

In accordance with fourth aspects of the present invention the shanks 32 incorporate a key feature 33. This key feature 33 generally comprises a chamfer which has a reciprocal part in the holder 30 and in particular the aperture 404. In such circumstances by ensuring that correct location of the probe can only be achieved with key mating between the feature 33 and its reciprocal part of the holder 30 or an insert peg it will be understood that the probe will be consistently presented in the respective holders. In such circumstances there will be consistency of presentation along the respective axes X-X and any inconsistencies and eccentricities will therefore be consistent between the measured positions. Thus, with a known distance 407 between the centre lines for the holders 30 adjustments can be made with regard to measured position.

As indicated above the provision of a measuring or positioning arrangement or apparatus which incorporates a multiple holder configuration as depicted in FIG. 6 has great benefits in order not to waste space above or below the holder. However, to ensure precision usage it is necessary to have consistency of eccentricity.

Generally, the holders through the apertures 304 allow a 360° clamping action. The shanks 32 in such circumstances can rotate within the aperture 404. However even if a square shank or rectangular shank were utilised it will also be understood that the shanks could be presented in the apertures inappropriately such that there is inconsistency and variation in the eccentricity. Thus, as indicated in accordance with aspects of the present invention a key feature is provided typically in the form of a chamfer. The chamfer ensures that there is only one allowed contact orientation with a reciprocal key feature in the aperture 404 and the probe is in the right configuration. This can be achieved through shaping of the aperture 404 or as illustrated by ensuring that a fixing pin or peg 34 will only allow correct orientation through the pin intersecting the periphery on one side and contacting the key element or chamfer of the shank 32. Once contact is made it will be understood that there is repeatability with regard to ensuring that the probe is correctly orientated both in the upper and lower holders 30a, 30b. Thus, any eccentricity in the probe and in particular the stylus 31 does not affect the measured results. It will be appreciated if there is a radial eccentricity in one direction by the stylus 31 and the stylus is incorrectly associated with the other holder at a 180° inversion then that eccentricity will double the inaccuracy in the measured result.

By the fourth aspects of the present invention as depicted in FIG. 6 greater accuracy can be achieved in a measuring or positioning apparatus even though a probe is transferred from one holder to the other. Furthermore by utilising a 360° clamp to the shank 32 it will be understood that the stylus is firmly held about the centre line X-X within the holder 30 whilst the probe and in particular the stylus 31 is always presented in the same orientation within its current holder for maintenance of accuracy.

It will be understood that bringing the stylus into association with a component in order to determine position as well as dimensions requires careful presentational control. Too forceful a contact will result in distortion of the probe and stylus and therefore inaccuracy with regard to precision. However it is also necessary to drive movement of the carriage and associated probe and that such driving is accurate such that measurements can be taken.

Figure 7:
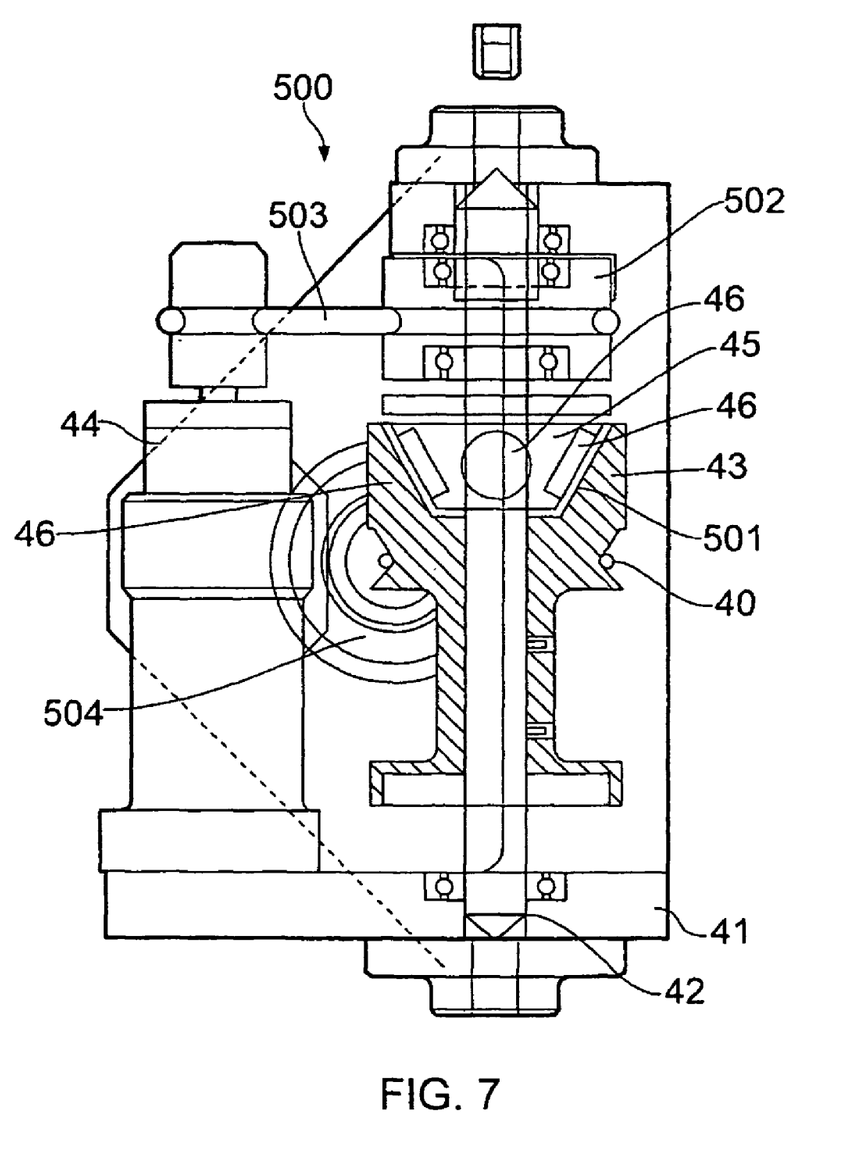

FIG. 7 provides a part cross sectional illustration of a positioning arrangement 500 in accordance with fifth aspects of the present invention. Generally a cable 40 extends around a pulley 43 having a conical seat 501 in the arrangement 500. Within the seat 501 a conical element 45 is presented upon a spindle 42. In the embodiment depicted the spindle 42 provides a common spindle for both the pulley 43 and the conical element 45. The conical element 45 is also associated with a drive pulley 502 which is driven in turn by a drive belt 503 and a motor 44. Thus, the motor 44 which will typically be a small direct current electric motor will turn the pulley 502 through the belt 503 and so the conical element 45. The conical element 45 on its conical surface incorporates magnetic elements 46. The magnetic elements 46 induce electromagnetic eddy currents within the pulley 43. Thus, as the conical element 45 is driven through the eddy currents created the pulley 43 will follow as a result of Lorenz effects. Such an arrangement will create an effective drive clutch for transferring the driven rotation from the motor 44 to the pulley 43 and therefore movement of the cable 40 in use.

The whole arrangement 500 will be robustly supported in a mounting 41 such that vibration will not be transferred from the motor 44 to the pulley 43 which will generate jerking motions or variability. As can be seen on one side of the cable 40 a counterweight 504 will be presented whilst on the other side of the cable 40 a probe presented on a carriage will be secured. The weight 504 and the carriage (not shown) will be balanced in terms of weight such that turning of the pulley 43 will move the weight 504 and carriage (not shown) upwards and downwards with limited residual weight. The pulley 43 acts as a fulcrum for the balanced weight presented on the cable 40.

The conical element 45 and pulley 43 as indicated are both presented on the spindle 42 in the embodiment depicted. In such circumstances both the conical element 45 and the pulley 43 can spin and rotate upon that spindle 42. Advantageously a low friction or air bearing will be created to facilitate reduced friction to such rotation. In such circumstances the relatively weak Lorenz forces created by induced eddy currents between the conical element 45 and the conical seat 501 of the pulley 43 will be adequate to cause displacement of the balance between the counterweight 504 and the carriage (not shown) upon the cable 40. This balance is fine and therefore only minimum torque is required by the driving action between the conical element 45 and the pulley 43 to generate movement in either direction.

In the embodiment depicted torque is generated by relative rotation between the driven conical element 45 and the follower pulley 43. However, it will also be understood that the pulley could be driven and the conical element act as a follower dependent upon requirements. As indicated the conical element 45 acts as a male part with magnets 46 set upon its conical diameter. In accordance with and dependent upon the clearance gap between the conical element 45 and the conical seat 501 it will be understood that eddy currents and so Lorenz effects will be generated such that one component will follow the driven other. The torque generated can be varied by adjusting the gap between the conical element 45 in terms of its conical diameter surface and the seat 501. In such circumstances torque transfer and generation can be rendered greater or smaller dependent upon operational requirements concerning accuracy and balance across the cable 40.

By fifth aspects of the present invention as depicted in FIG. 7 it will be understood that the torque action allows application of effectively a constant measuring load in terms of touch upon a component by a probe and in particular the stylus of that probe. Minimising touch contact will reduce distortion of the probe and any other parts of the measuring arrangement and therefore improve accuracy with respect to determination.

Fifth aspects of the present invention effectively define a drive clutch through induced eddy current association across a conical element to a conical seat configuration. Such an arrangement is contactless and therefore has reduced friction. It will also be understood that it is possible to create lower probing forces with potentially reduced speed of operation in terms of movement of the probe in use. It will be understood that the drive clutch created between the conical element 45 and the seat 501 is only operational when there is relative spinning. Thus, the carriage has effectively a friction free balanced movement.

Drive is created through an air gap between the conical element 45 and slips when contact is made with the piece to be measured through the stylus of a probe. Measuring pressure is minimised and as indicated friction is almost eliminated within the positioning and measuring apparatus.

Although aspects of the present invention have been described principally with regard to metrology apparatus and in particular measuring and positioning arrangements for such apparatus it will be understood that aspects of the present invention may be utilised in other areas. For example with regard to the first aspect of the invention as described above it will be understood that the process with regard to using a carrier upon an angular presented bearing surface rail could also be utilised for accurate positioning of components or indicators where such positioning may be important for component retrieval or survey or presentation of a tool such as a laser for operational functions. Similarly with regard to second aspects of the present invention capability of reliably creating a rail by presentation upon a universal joint and effective stressless alteration of that rail orientation for perpendicularity or other configuration may be advantageous in other situations where accurate presentation of the rail is important such as for example again with regard to component positioning or tool positioning. Third aspects of the present invention in creating an air bearing for a counterweight can also be utilised in other situations where smooth operation of the counterweight is important such as to balance tool arm movements. The drive clutch created by fifth aspects of the present invention has particular applicability with regard to situations where minimal force is required in terms of torque to allow smooth operation of generally well balanced loads either side of a cable or other coupling.

Modifications and alterations to aspects of the present invention will be appreciated by persons skilled in the technology. Positioning or measuring or metrology apparatus as indicated above as examples of utilisation of aspects of the present invention depend upon a high degree of calibration and initial set up. Thus, generally the components will be formed from stable and appropriately robust or flexible materials. Interaction of these materials in terms of expansion and contraction, wear and stressing will result in tolerance stack up and variability in measured results. Aspects of the present invention may be combined or used separately to create apparatus which achieves more consistency with regard to positioning and measuring either collectively or individually in order to maximise the potential accuracy of positioning for a particular circumstance.

The invention claimed is:

1. A positioning apparatus comprising a rail having an angular cross section between a first bearing surface and a second bearing surface to present a carriage, the first bearing surface engaged by a see-saw bearing element and the second bearing surface engaged by a leaf bearing element to enable locking of the carriage against a fixed bearing, the see-saw bearing defined by a cross member arrangement extending between two spaced first ball engagers having a respective first displacement adjuster to allow displacement towards the first bearing surface for centralising the carriage upon the rail, the leaf bearing comprising a leaf spring extending between two spaced second ball engagers to engage the seal bearing surface in compression.

2. Apparatus as claimed in claim 1, wherein the cross member is centrally constrained by an end and/or a central constraint to define a potential concave or convex bowing to the cross member away from the constraint as a result of extension of each first displacement adjuster to displace each first ball engager towards the first bearing surface.

3. Apparatus as claimed in claim 1, wherein the leaf spring is bowed with an apex away from the second bearing surface and a saddle adjuster to engage the apex to adjust compression of the second ball engagers towards the second bearing surface.

4. Apparatus as claimed in claim 1, wherein each second ball engager has a second displacement adjuster to displace the second ball engager towards the second bearing surface.

5. Apparatus as claimed in claim 1, wherein there are two cross members with a saddle member located between the cross members for the respective first ball engagers.

6. Apparatus as claimed in claim 5, wherein the saddle members are slidable upon each cross member.

7. Apparatus as claimed in claim 1, wherein the first ball engagers and/or the second ball engagers comprise worm screws with end seats for a ball bearing.

8. Apparatus as claimed in claim 7, wherein the ball bearing sits in the seat.

9. Apparatus as claimed in claim 7, wherein the ball bearing has a spigot guide extending through an aperture in the seat to align the ball bearing with the end seat.

10. Apparatus as claimed in claim 9, wherein the aperture allows fluid flow to facilitate a fluid bearing.

11. Apparatus as claimed in claim 10, wherein the fluid is air.

12. Apparatus as claimed in claim 1, wherein the carriage and the rail allow distribution of the fluid bearing between them to facilitate slide motion of the carriage upon the rail.

13. Apparatus as claimed in claim 12, wherein the fluid bearing is defined by air flow about the first and/or second ball engagers.

14. Apparatus as claimed in claim 1, wherein the rail has a triangular cross section.

15. Positioning apparatus comprising a rail to present a carriage with a counterbalance within a hollow passage, the passage and the counterbalance having a limited gap between them to allow slide movement, the counterbalance having surface apertures towards the passage, the surface apertures extending from an end aperture through an internal conduit within the counterbalance whereby displacement of the counterbalance in the hollow passage stimulates fluid flow of a fluid in the hollow passage through the surface apertures to provide a bearing for the counterbalance within the hollow passage.

16. Apparatus as claimed in claim 15, wherein the hollow passage is substantially closed and is provided within the rail.

17. Apparatus as claimed in claim 15, wherein the surface apertures are provided with different sizes and/or distributions for distribution of fluid flow through the surface apertures.

18. Apparatus as claimed in claim 15, wherein the counterbalance incorporates end apertures at either end of the counterbalance.

19. Apparatus as claimed in claim 15, wherein the carriage is associated with the counterbalance through a cable over a pulley.

20. Apparatus as claimed in claim 15, wherein there is a plurality of surface apertures spaced radially and/or longitudinally along the counterbalance.

* * * * *